United States Patent [19]
Sugimoto et al.

[11] Patent Number: 5,958,577
[45] Date of Patent: Sep. 28, 1999

[54] TRANSPARENT BULK SILICA POROUS MATERIAL WITH UNIFORM PORE SIZE AND DISTRIBUTION

[75] Inventors: Noriaki Sugimoto; Shinji Inagaki, both of Nagoya; Yoshiaki Fukushima, Aichi-ken; Tatsumi Hioki, Nagoya; Makoto Ogawa, Mitaka, all of Japan

[73] Assignee: Kabushiki Kaisha Toyota Chuo Kenkyusho, Aichi-ken, Japan

[21] Appl. No.: 09/003,461

[22] Filed: Jan. 6, 1998

[30] Foreign Application Priority Data

Jan. 10, 1997 [JP] Japan ..................................... 9-014634

[51] Int. Cl.$^6$ ....................................................... B32B 3/12
[52] U.S. Cl. .................. 428/333; 428/312.6; 428/316.6; 428/446; 423/335; 423/338; 423/339
[58] Field of Search ..................................... 423/335, 338, 423/339; 428/312.6, 316.6, 333, 446

[56] References Cited

U.S. PATENT DOCUMENTS

| 5,057,296 | 10/1991 | Beck . |
| 5,110,505 | 5/1992 | Herron et al. . |
| 5,128,114 | 7/1992 | Schwartz . |
| 5,364,797 | 11/1994 | Olson et al. . |
| 5,508,081 | 4/1996 | Inagaki et al. . |
| 5,580,370 | 12/1996 | Kuma et al. . |
| 5,672,556 | 9/1997 | Pinnavaia et al. . |
| 5,770,275 | 6/1998 | Raman et al. . |
| 5,858,457 | 1/1999 | Brinker et al. . |

FOREIGN PATENT DOCUMENTS 2269377  9/1994  United Kingdom .

OTHER PUBLICATIONS

Makoto Ogawa, Formation of Novel Oriented Transparent Films of Layered Silica–Surfactant Nanocomposites, J. Am. Chem. Soc, vol. 116, No. 17, 1994, pp. 7941 and 7942, Aug. 24, 1994.

Beck et al., A New Family of Mesoporous Molecular Sieves Prepared with Liquid Crystal Templates, J. Am. Chem. Soc. 1992, 114, pp. 10934–10843, Jun. 30, 1992.

Primary Examiner—Deborah Jones
Assistant Examiner—Jason Savage
Attorney, Agent, or Firm—Oblon, Spivak, McClelland, Maier & Neustadt, P.C.

[57] ABSTRACT

The method for producing a bulk silica porous material is presented. The obtained material has a large crystal size serving to reduce light scattering, and uniform and adjustable pore size. This can be utilized for optical and electronic functional materials. The method comprises the steps of:

forming a silica/surfactant composite by mixing starting materials containing an alkoxysilane, water and a surfactant and allowing to the starting materials to react;

maturing said silica/surfactant composite by allowing the same to stand in a closed container to effect the development of a silica network structure and the formation of porous structure in said composite;

drying said matured silica/surfactant composite for removing the solvent and for condensation of said matured silica/surfactant composite; and, sintering said condensed silica/surfactant composite to remove the surfactant to obtain a silica porous material.

4 Claims, 1 Drawing Sheet

TRANSPARENT BULK SILICA POROUS MATERIAL WITH UNIFORM PORE SIZE AND DISTRIBUTION

BACKGROUND OF THE INVENTION

1. Field of the Invention

The present invention relates to a bulk silica porous material and a method for producing a bulk silica porous material which has a large crystal size serving to reduce light scattering, which has uniform and adjustable pore size and which can be utilized for optical and electronic functional materials.

2. Description of the Related Arts

Among porous materials, the one having a pore size (herein means the diameter of a pore) ranging from 1 to 10 nm and the pore size distributing in an extremely narrow range is referred especially to as a meso porous material.

Such a meso porous material is used as a material for separation and adsorption of gases and solutions because of its substantially uniform and adequate pore size. Such a porous material is used also as a functional material such as an optical cell or an electronic cell when the pore is packed with metals or semiconductor materials.

The meso porous materials described above are produced, for example, by the ion exchange between Kanemite which is one of lamellar silicates and a surfactant (Japanese Laid-Open Patent Publication 4-238810) or by the hydrothermal synthesis from silica gel and a surfactant in an air-tight pressure vessel.

However, only a meso porous material having a small crystal size can be obtained by a conventional method.

Accordingly, when such a meso porous material is used as an optical functional material, undesirable light scattering leads to only a limited range of application.

When such a meso porous material is used as an electronic functional material, poor processability of the meso porous material leads to the requirement of a special method for obtaining an electrode contact, resulting in inconvenience for handling.

Thus, a meso porous material obtained by a conventional method is difficult to be utilized as an optical or electronic functional material.

The optical functional material mentioned above is one of those employed as starting materials for optical filters, polarization cells, wavelength conversion cells, optical operational cells, and the like.

The electronic functional material mentioned above is one of those employed as starting materials for quantum operational cells, electronic waveguide cells, ultra high density memories, and the like.

SUMMARY OF THE INVENTION

In view of the problems described above, the present invention is aimed to provide a method for producing a bulk silica porous material which has a large crystal size serving to reduce light scattering, which has uniform and adjustable pore size and which can be utilized for optical and electronic functional materials.

The method for producing a bulk silica porous material according to the present invention comprises the steps of:

forming a silica/surfactant composite by mixing starting materials containing an alkoxysilane, water and a surfactant, and allowing the starting materials to react;

maturing said silica/surfactant composite by allowing the same to stand in a closed container to effect the development of a silica network structure and the formation of porous structure in said composite;

drying said matured silica/surfactant composite for removing the solvent and for condensation of said matured silica/surfactant composite; and, sintering said condensed silica/surfactant composite to remove the surfactant to obtain a silica porous material.

A method according to the present invention involves a maturing step wherein a silica/surfactant composite obtained by mixing starting materials and reaction of the same is allowed to stand in a closed container whereby developing the silica network structure and forming the porous structure in the composite.

This step prevents rapid removal of the solvent from the silica/surfactant composite. Therefore, the composite undergoes no rapid condensation, whereby avoiding destruction due to solidification.

Accordingly, a method according to the present invention can provide a bulk silica porous material having a crystal size as large as 0.1 mm to 10 cm.

Here, "a bulk silica porous material" referred to is a silica porous material having a crystal size of 0.1 mm or more.

No rapid condensation of the composite also provides a bulk silica porous material having a large and uniform pore size.

Thus, a bulk silica porous material obtained by a method according to the present invention has a large primary structure with respect to the light wavelength unlike to a silica porous material obtained by a conventional method. Accordingly, the bulk silica porous material described above is difficult to cause light scattering, resulting in excellence in transparency.

The optical characteristics of a silica are described below, and a silica is characterized generally by no absorption within the visible light range and by visually transparent appearance.

The expression "transparent to visible lights" herein means that when the transmittance is determined at a wavelength ranging from 400 nm to 800 nm, the transmittance observed is 80% or more at any wavelength and almost constant regardless of the wavelengths (FIG. 1).

A silica porous material obtained by a conventional method comprises small crystals, some of which have the crystal size almost similar to the wavelength of a light. Therefore, light scattering at an interface is significant, resulting in opacity.

In addition, since a conventional silica porous material is morphologically a powder of a small particle size, it can not readily be examined for its optical characteristics.

On the contrary, a bulk silica porous material having a large crystal size sufficient to be examined for its optical characteristics can be provided according to the present invention. Thus, a bulk silica porous material obtained by a method according to the present invention can be examined for its optical characteristics such as transmittance even when using an ordinary position to transmitting light.

Accordingly, the bulk silica porous material mentioned above can readily be evaluated for its performance when used as an optical functional material.

A bulk silica porous material obtained according to the present invention causes less light scattering, also due to its uniform pore size.

As described above, a bulk silica porous material produced by a method according to the present invention is transparent to visible lights and causes less light scattering.

Accordingly, the bulk silica porous material described above can be used as an optical functional material and is suitable for optical materials such as optical fibers, optical filters and polarization plate as well as optical devices.

Especially when applied to an optical fiber, the present material can enclose a functional material into the pore of a size of the order of nanometers, whereby providing an excellent performance such as that of fiber-type wavelength conversion cell, which can not be achieved by a conventional material.

Otherwise, also unlike to a conventional material, the present material, when used as a semiconductor laser medium of variable oscillation wavelength, can provide the laser of the oscillation wavelength which can be varied by controlling the pore size.

Since the bulk silica porous material described above has the uniform pores whose sizes are within the range from 1 to 10 nm and which can be utilized as quantum points or lines by being filled with semiconductors or metals, it can be utilized as an electronic functional material and is suitable for electronic materials and devices such as quantum operational cells, electronic waveguide cells, ultra high density memories, and the like.

Especially when applied to a quantum operational cell, the present material allows a cell to be operated at quite a higher temperature than the cell made by a conventional semiconductor manipulating technology can be operated because of higher quantum confinement effect on the material enclosed in a pore compared with a conventional material.

When a bulk silica porous material obtained according to the present invention is used as a host material for an inclusion compound, ability of keeping a molecular or atomic cluster as large as 1 mm or larger, which can not be achieved by a conventional zeolite or meso porous material, is obtained.

The inclusion compound mentioned above is a material keeping a functional material such as a functional organic molecule in its pore which can be used as a material for a catalyst.

In the method according to the present invention, the silica network structure comprised in a bulk silica porous material is formed by covering a micelle aggregate of the surfactant with the silica when producing a silica/surfactant composite from the starting materials of an alkoxysilane, water and a surfactant.

The micelle aggregate is removed in the drying step and the sintering step. The place, in such silica/surfactant composite, where the micelle aggregate was initially present but subsequently removed becomes the pore of a bulk silica porous material.

The size and the shape of the micelle aggregate mentioned above may vary depending on the length of the carbon chain of the surfactant described above.

Thus, in the present invention, the properties of the pore, such as the size, may vary depending on the surfactant employed.

The characteristics of the structure of a bulk silica porous material according to the present invention are described below.

Since the bulk porous material described above has the pore which is formed using the micelle aggregate described above as a template, it has an extremely uniform pore size distribution.

The template described above is formed as a result of interaction between the hydrophilic and hydrophobic groups of the surfactant described above. The surfactant is in a form of a rod, which forms the micelle aggregate described above as a result of the interaction with the silica.

Thus, the resultant silica/surfactant composite serves as a precursor for a bulk silica porous material according to the present invention.

In a conventional synthesis, the starting materials are converted under hydrothermal synthesis condition (i.e., in the presence of water and heat) into an organic micelle, which is subsequently crystallized to form a meso porous material. As a result, the organic micelle described above is in the form of a hexagonal crystal lattice, whereby representing honeycomb structure.

In the present invention, the precursor described above - is dried over a prolonged period at an atmospheric temperature and subsequently sintered to remove the micelle aggregate from the silica/surfactant composite.

In this course, the micelle aggregate before being removed from the silica/surfactant composite is not crystallized. It is not in the form of a complete crystal lattice structure.

Based on the results of transmission electron microscope observation and X-ray structure analysis, a bulk silica porous material according to the present invention has the linear pores which reflects the structure of the micelle aggregate and the entire bulk silica porous material is formed while keeping the distance between the pores which were previously the adjacent micelle aggregates in the silica/surfactant composite to be almost uniform.

On the other hand, in a conventional meso porous material, the organic micelles are aligned in the structure in a hexagonal system. However, since the silica component becomes larger than this structure, the pore content is reduced but the entire density tends to become higher.

When comparing another type of silica porous material, namely a porous glass obtained by means of phase separation, with a bulk silica porous material according to the present invention, the present material is characterized by higher uniformity in the size of the pores formed by means of a micelle aggregate as well as the linear pore shape, while the porous glass is characterized by the network of the pores. The difference in their characteristics is the morphology of the pore.

Because of the structural characteristics, the pore of a bulk silica porous material according to the present invention can be filled with various materials such as metals, semiconductors, dielectrics and the like to be employed as an enclosing-type functional material, while adjusting the pore size easily in accordance with the particular application of the bulk silica porous material.

A bulk silica porous material obtained according to the present invention is not a complete single crystal and has little anisotropy in the direction of the pores therein, whereby ensuring the continuity of the pores. Accordingly, a substance such as a gas can diffuse from one side of the bulk silica porous material to the other side.

Thus, a bulk silica porous material obtained according to the present invention can be used as a material for screening and separation through which molecules larger than its pore size are separated from smaller ones.

Since a bulk silica porous material obtained by the present method can be molded, for example, by introducing it in the state of the precursor (in the form of a sol) into a desired mold, it allows the material to be formed into the desired shape easily.

Thus the silica porous material described above can readily be utilized as various functional materials.

As described above, according to the present invention, a method for producing a bulk silica porous material which has a large crystal size serving to reduce light scattering, which has uniform and adjustable pore size and which can be utilized for optical and electronic functional materials can be provided.

Figure 1:
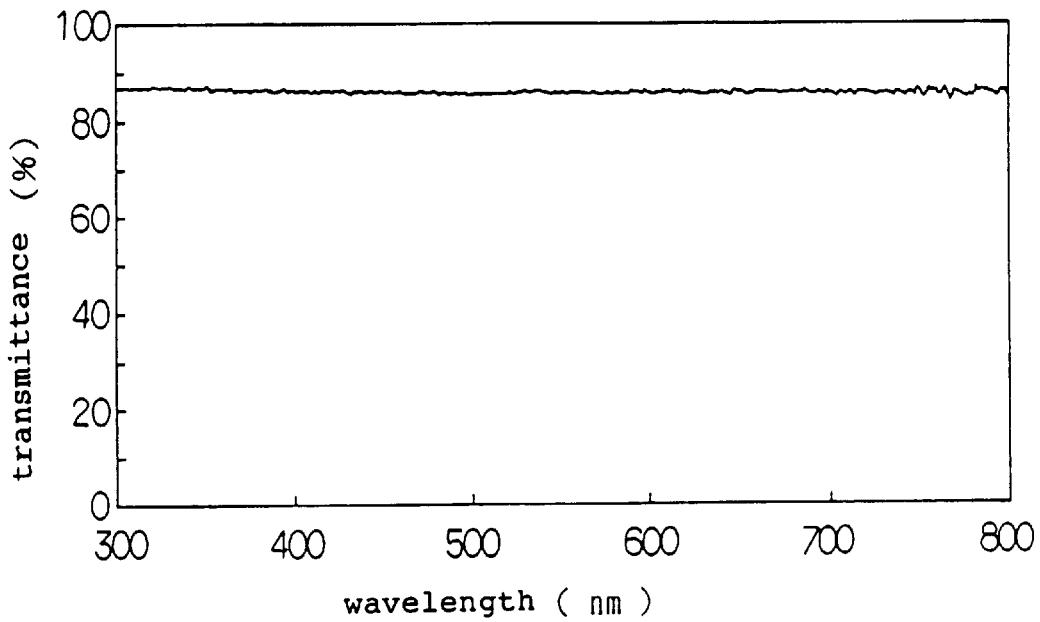
FIG. 1 is a graph showing a transmittance curve of the bulk silica porous material at visible lights according to the embodiments in the present invention.

DETAILED DESCRIPTION OF THE INVENTION (Forming Step)

As an alkoxysilane described above, tetramethoxysilane, tetraethoxysilane and tetrapropoxysilane can be employed.

As a surfactant described above, a compound having a long chain alkyl group and a hydrophilic group can be employed. Such a surfactant includes alkyltrimethylammoniums. Laurylic acid and sodium dodecyl sulfate can be employed as a surfactant.

In the forming step described above, the composite is generated in the solution by mixing the surfactant and water, and then the alkoxysilane and a water-soluble component of the surfactant are dissolved in water. This water-soluble part and water correspond to the solvent removed in the drying step.

In this forming step, "molar ratio of silica/surfactant" is preferably within the range from 2 to 10.

The expression "molar ratio of silica/surfactant" described above is intended to mean the ratio of the total amount of Si to the surfactant added in the starting material.

As a result of the procedure described above, a bulk silica porous material having a sufficient pore volume can be obtained.

When the "molar ratio of silica/surfactant" is greater than 10, the interaction between surfactant molecules is reduced and micelle aggregation leading to pore formation in the silica network structure is not achieved, resulting in a glass having almost no pore volume.

When the "molar ratio of silica/surfactant" is less than 2, the amount of the silica is not sufficient to enclose the micelle aggregate of the surfactant and the silica network structure can not be developed sufficiently, and subsequent removal of the surfactant causes destruction of the structure of the composite, resulting in a bulk silica porous material which is no longer transparent and not suitable for an optical functional material.

The "molar ratio of silica/surfactant" is preferably 3 to 5.

Although the procedure to mix the alkoxysilane, the surfactant and water is not particularly specified, it is preferable that water is applied to the alkoxysilane first and then the mixture is stirred at room temperature for a period of 30 minutes to 3 hours prior to the addition of the surfactant.

The water is added preferably in an amount of 0.5 to 10 moles per 1 mole of silicon contained in the alkoxysilane.

By the procedure of mixing described above, the alkoxysilane is readily converted to a linear alkoxysilane polymer. The interaction between the alkoxysilane polymer and the micelle aggregate of the surfactant results in a transparent bulk silica porous material having no optical defects.

When the amount of the water added as described above is less than 0.5 moles, the hydrolysis of the alkoxysilane is not sufficient to effect gel formation, and a bulk silica porous material may not be obtained. When the amount of the water exceeds 10 moles, the hydrolysis and the condensation polymerization of the alkoxysilane proceed so rapidly that the silica network structure can not enclose the micelle aggregate of the surfactant, resulting in a glass having no pores.

When mixing as described above, it is preferable to add a small amount of acid.

As a result, each component becomes more soluble and a uniform aqueous solution of the alkoxysilane and the surfactant can readily be made.

Also when mixing as described above, it is preferable to adjust the pH within the range from 1 to 4.

When the pH is less than 1, the hydrolysis and the condensation proceed too fast and the formation of the pores having a uniform size is impaired. When the pH is higher than 4, the solubility of each component is insufficient and essential hydrolysis can not be effected.

The acid to be added as described above may be a dilute hydrochloric acid (for example, 2N HCl). Other acids such as sulfuric acid can also be employed.

The surfactant may be simply added in a form of powder to water or added to water after being dissolved in a small amount of water prior to addition.

(Maturing Step)

The maturing step described above is conducted preferably at a temperature of 20 to 110° C. for a period of 12 hours or longer.

When the temperature is higher than 110° C., the condensation polymerization of the alkoxysilane proceeds too rapidly, resulting in inhibition of formation of a porous structure.

When the maturing period is shorter than 12 hours, the silica network structure undergoes insufficient development, which may cause a crack in the network structure during the subsequent drying step, resulting in a bulk silica porous material having no transparency to the visible lights.

(Drying Step)

In the drying step described above, primarily the rate of evaporation of the methanol solution formed in the preceding maturing step should be controlled.

The methanol solution is formed as a result of the reaction during the forming and maturing steps represented by the formula:

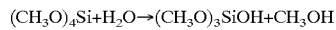

$$(CH_3O)_4Si+H_2O \rightarrow (CH_3O)_3SiOH+CH_3OH$$

The drying step is conducted preferably at a temperature of 20 to 110° C.

As a result, methanol and water can gradually be evaporated.

More preferably, the drying step is conducted while keeping the partial pressures of methanol and water in the atmosphere to be within the range from 50 to 80% of the saturated vapor pressure.

When the evaporation of the methanol solution proceeds too fast, a crack is formed upon condensation polymerization of the silica/surfactant composite, resulting in a bulk silica porous material having no transparency to the visible lights.

(Sintering Step)

The sintering step is conducted preferably at a temperature of 500 to 1000° C. The temperature is raised preferably at a rate of 2 to 10° C./minute in the sintering step, desirably in an atmosphere of air or oxygen flow.

A heating temperature below 500° C. may result in residual unburnt organic components in the pores, while a heating temperature higher than 1000° C. may break the silica network structure, resulting in an impaired porous structure.

(Bulk Silica Porous Material)

According to the method described above, a bulk silica porous material wherein the pore size of the maximum peak in the pore size distribution curve is within the range from 1 to 10 nm, and 60% or more of the entire pore volume is attributed to the pores within the range from −40% to +40% of the maximum peak pore size in the pore size distribution curve, the crystal size is in the range of from 0.1 mm to 10 mm, and the optical transmittance in the visible light range (400 nm to 800 nm) is 80% or more can be obtained.

Such bulk silica porous material is an excellent porous material characterized by a large crystal size as described above and by a large and uniform pore size.

Figure 2:
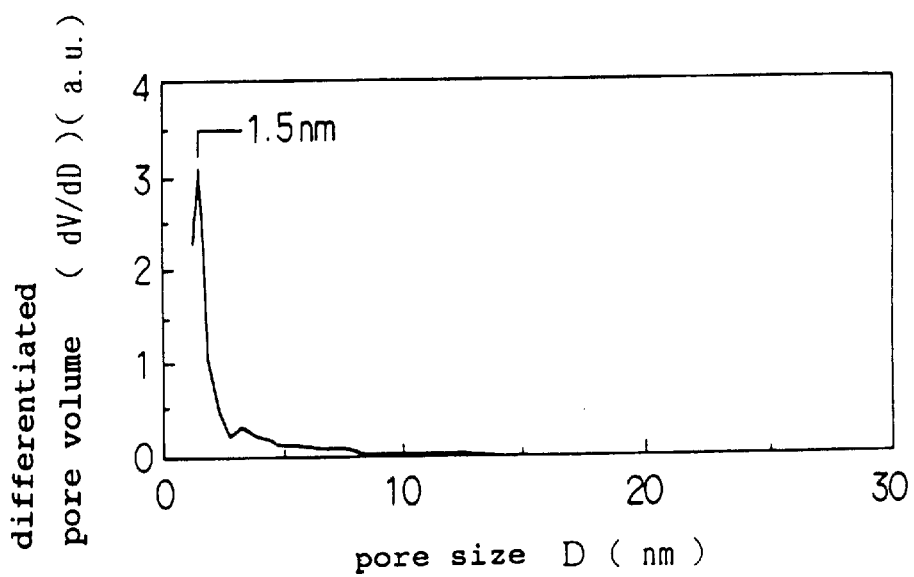
FIG. 2 is a graph showing a pore size distribution curve of the bulk silica porous material according to the embodiments in the present invention.

The pore size distribution curve mentioned above is obtained by plotting the value (dV/dD) obtained by differentiating the pore volume of a meso porous material by the pore size (D) versus the pore size (D) (FIG. 2).

The pore size distribution curve can be obtained, for example, by means of gas adsorption method. The gas employed most frequently in such gas absorption method is nitrogen.

According to the method described above, a bulk silica porous material wherein the pore size of the maximum peak in the pore size distribution curve is within the range from 1 to 10 nm, and the water vapor adsorption isothermal curve has a part where the change in the adsorption is 0.1 g/cc or more when the relative vapor pressure is changed by 0.2 can be obtained.

Such bulk silica porous material is an excellent porous material having various properties described in the section of the method for producing.

Also according to the method described above, a bulk silica porous material in which 80% by weight or more relative to the entire material is composed of silicon and oxygen can be obtained.

As described above, this example provides a bulk silica porous material which has a crystal pore size serving to reduce light scattering, which has uniform and adjustable pore size and which can be utilized for optical and electronic functional materials.

DESCRIPTION OF THE PREFERRED EMBODIMENT

The method for producing the silica porous material is described below.

Starting materials of an alkoxysilane, water and a surfactant are reacted by mixing them together to form a silica/surfactant composite, and then a maturing step wherein the silica/surfactant composite is allowed to stand in a closed container whereby developing the silica network structure and forming the porous structure in the composite is conducted. Then, the silica/surfactant composite is dried to evaporate the solvent and to condense the composite, and accordingly a silica porous material is sintered to remove the surfactant from the composite. Completing these steps, a bulk silica porous material is obtained.

The method for producing the bulk silica porous material is described in detail below.

15.2 g of tetramethoxysilane (TMOS) as an alkoxysilane was admixed with 3.6 g of water and about 0.1 g of 2N HCl, and the mixture was stirred at room temperature for 1 hour.

To the solution obtained by such addition and mixing, 7.71 g of dodecyltrimethyl ammonium bromide (DDTA) as a surfactant was added and the mixture was stirred vigorously for several minutes to obtain a uniform solution of a precursor.

Then the precursor solution was subjected to the maturing step for 24 hours while being enclosed and kept at 45° C. to obtain a highly transparent silica/surfactant composite.

In order to complete the condensation polymerization of the silica network structure of the silica/surfactant composite, the following drying step was conducted.

While keeping the atmospheric partial pressure of methanol at about 50%, the silica/surfactant composite was dried at 45° C. for 36 hours to obtain a dried transparent silica/surfactant composite having no cracks.

Subsequently, the dried silica/surfactant composite was heated at the rate of 2° C./minute to 550° C. under the flow of 1:4 mixture of oxygen:nitrogen, at which the complex was allowed to stand for 6 hours prior to cooling to room temperature, whereby completing the sintering step.

By this step, the surfactant was removed from the silica/surfactant composite and the condensation polymerization of the silica network structure was completed to yield a bulk silica porous material.

The bulk silica porous material obtained was a square of 1 to 10 mm.

The transmittance curve of this bulk silica porous material at visible lights (visible-UV transmission spectrum at wavelength ranging from 300 to 800 nm) was determined and is shown in FIG. 1. This transmittance curve was obtained by using an automatic spectrophotometer (HITACHI Model 330) with the spot path of 5 mm.

As evident from the figure, the bulk silica porous material according to the present invention exhibited a constant transmittance of 80% or higher at any wavelength of the visible lights.

Thus the bulk silica porous material according to the present invention was proven to be transparent to the visible lights.

The pore size distribution curve of the bulk silica porous material above was obtained by calculation according to Cranston-Incaly method based on the nitrogen adsorption isothermal curve determined by a constant volume method at liquid nitrogen temperature. The pore size distribution curve obtained from the nitrogen adsorption isothermal curve determined is shown in FIG. 2.

As evident from this figure, the bulk silica porous material according to the present invention had the pores whose sizes are uniform.

The advantage of the present invention is described below.

A bulk silica porous material obtained by the present method has the crystal size of 1 to 10 mm and is transparent to the visible lights. The pores having the size of 1.5 nm are predominant (FIG. 2).

Thus the bulk silica porous material described above can be used, when enclosing a semiconductor or a metal, as a quantum effect cell or a semiconductor laser medium, and in such case, it exhibits an excellent performance since it can be operated at a high temperature and it allows the laser oscillation wavelength to be designed as desired by means of controlling the pore size.

What is claimed is:

1. A bulk porous silica material comprising:

a silica crystal wherein the silica crystal has a size within 0.1 mm to 10 mm; and linear pores having a uniform pore size, the pore size of the maximum peak in the pore size distribution curve being within the range from 1 to 10 nm, and 60% or more of the entire pore volume of the pores being attributed to the pores within the range from −40% to +40% of the maximum peak pore size in said pore size distribution curve, and the bulk porous silica material having an optical transmittance of 80% or more in the visible light range of 400 nm to 800 nm.

2. A bulk silica porous material according to claim 1, wherein the weight content of this silica is 80% or more.

3. A bulk porous silica material comprising:

a silica crystal wherein the silica crystal has a size within 0.1 mm to 10 mm; and linear pores having a uniform pore size, the pore size of the maximum peak in the pore size distribution curve being within the range from 1 to 10 nm, and the bulk porous silica material having a water vapor adsorption isothermal curve in a part of which the change of adsorption is 0.1 g/cc or more when the relative vapor pressure is changed by 0.2.

4. A bulk silica porous material according to claim 3, wherein the weight content of this silica is 80% or more.

* * * * *